US010827679B2

(12) United States Patent
Dennis

(10) Patent No.: US 10,827,679 B2
(45) Date of Patent: Nov. 10, 2020

(54) STRAW BUNCHER

(71) Applicant: Ryan Dennis, Holdfast (CA)

(72) Inventor: Ryan Dennis, Holdfast (CA)

(*) Notice: Subject to any disclaimer, the term of this patent is extended or adjusted under 35 U.S.C. 154(b) by 383 days.

(21) Appl. No.: 15/596,542

(22) Filed: May 16, 2017

(65) Prior Publication Data

US 2017/0325403 A1 Nov. 16, 2017

(30) Foreign Application Priority Data

May 16, 2016 (CA) .................................... 2930011

(51) Int. Cl.
*A01D 76/00* (2006.01)
*A01D 57/12* (2006.01)
*A01D 85/00* (2006.01)

(52) U.S. Cl.
CPC ........... *A01D 76/006* (2013.01); *A01D 57/12* (2013.01); *A01D 85/001* (2013.01)

(58) Field of Classification Search
CPC ...... A01D 76/006; A01D 76/00; A01D 57/12; A01D 78/14; A01D 78/02; A01D 87/08
See application file for complete search history.

(56) References Cited

U.S. PATENT DOCUMENTS

| | | | | |
|---|---|---|---|---|
| 27,366 A * | 3/1860 | Johnson | ................. | A01D 76/00 56/380 |
| 1,512,750 A * | 10/1924 | Eberle | .................... | A01D 76/00 56/399 |
| 1,628,971 A * | 5/1927 | Halliday | ................ | A01D 76/00 56/380 |
| 1,947,572 A * | 2/1934 | Rutter | .................. | A01D 76/006 56/391 |
| 2,237,280 A * | 4/1941 | Coultas | ................ | A01D 76/006 56/10.2 R |
| 2,366,234 A * | 1/1945 | Blaydes | ............... | A01D 76/006 56/10.2 R |
| 2,377,686 A * | 6/1945 | Gemberling | ......... | A01D 76/006 56/392 |
| 2,472,953 A * | 6/1949 | Meyer | .................. | A01D 76/006 56/391 |
| 2,484,666 A * | 10/1949 | Anthony | .............. | A01D 76/006 56/392 |

(Continued)

FOREIGN PATENT DOCUMENTS

| | | | | |
|---|---|---|---|---|
| GB | 191317546 A | * | 3/1914 | .......... A01D 76/006 |
| GB | 679262 A | * | 9/1952 | ............ A01D 76/006 |
| GB | 2162733 A | * | 2/1986 | ............. A01D 76/00 |

*Primary Examiner* — Thomas B Will
*Assistant Examiner* — Joan D Misa
(74) *Attorney, Agent, or Firm* — NK Patent Law

(57) ABSTRACT

An apparatus for automating the process of bunching straw in a farming operation is disclosed. The straw buncher is a towable implement that includes one or more rakes mounted on a rotatable axle. The rakes gather straw. Rotation of the rake assembly is prevented by a stop mechanism that holds a rake in position using a resistive force until sufficient straw has gathered in front of the rake and the drag created by the straw overcomes the resistive force. At this point the rake begins to rotate, a cam on the rake assembly engages a drive system that turns the rake assembly until the next rake is in position. The implement works automatically and does not require monitoring by an operator to have straw bunches of a desired size be formed.

8 Claims, 4 Drawing Sheets

(56) References Cited

U.S. PATENT DOCUMENTS

| | | | | |
|---|---|---|---|---|
| 2,487,488 A | * | 11/1949 | Smith | A01D 76/006 |
| | | | | 56/10.2 R |
| 2,502,276 A | * | 3/1950 | Porter | A01D 76/006 |
| | | | | 56/392 |
| 2,521,909 A | * | 9/1950 | Godley | A01D 76/006 |
| | | | | 56/391 |
| 2,548,083 A | * | 4/1951 | Uthaug | A01D 76/006 |
| | | | | 56/386 |
| 2,583,655 A | * | 1/1952 | Larsen | A01D 76/006 |
| | | | | 56/387 |
| 2,593,780 A | * | 4/1952 | McIntosh | A01D 76/006 |
| | | | | 56/11.9 |
| 2,645,891 A | * | 7/1953 | Berkley | A01D 76/006 |
| | | | | 56/10.9 |
| 4,510,742 A | | 4/1985 | Lypka | |
| 6,421,997 B1 | | 7/2002 | Mann | |

* cited by examiner

STRAW BUNCHER

CROSS-REFERENCE TO RELATED APPLICATIONS

This application claims priority to Canadian Patent Application No. 2,930,011 filed on May 16, 2016. The entire content of which is incorporated by reference herein.

FIELD OF THE INVENTION

The invention is in the field of agricultural implements, and implements for bunching straw in a flax farming operation.

BACKGROUND

In many types of agricultural operations, following harvesting of the crop there is a considerable amount of plant material remaining. For example, in grain farming operations, once the grain is separated from the plant, there remains plant stalks and other portions of the plant. In some cases, this remaining plant material may have value for use as animal feed, or as plant material to till back into the soil where it eventually decomposes adding nutrients to help support the growth of subsequently planted crops. However, in some cases, for example in flax farming, the straw and other parts of the plant remaining after the flax seed has been harvested have no particular commercial value, and do not readily decompose. As such, it is common in flax farming to burn off the remaining straw, thereby improving the availability of organic and inorganic materials when the burnt material is then tilled back into the soil. In order to accomplish the burn off task efficiently, it is advantageous to first gather the straw into bunches or piles, which burn more easily as well as permitting easier control of the burn off process as opposed to simply lighting an entire field on fire.

There has been developed prior art apparatus developed to assist farmers in the gathering of flax straw into bunches, as bunches of straw are easier to manage during the burn off process. For example, U.S. Pat. No. 4,510,742 discloses a flax straw buncher for towing behind a combine where straw is bunched for subsequent burning. As bunches form behind a rake mechanism, the operator stops the combine, and then raises the rack to release the bunch. Following release of the bunch from the rake, the combine then is moved forward, the rake lowered back down, and then the combine operator proceeds forward to begin gathering flax straw into a new bunch.

Similarly, U.S. Pat. No. 6,421,997 discloses an analogous apparatus that comprises a rake and a collecting basket. This apparatus is also designed to be towed behind a vehicle. The rake collects straw, which piles up within the confines of the basket portion. Once the basket is sufficiently filled with straw, the operator actuates a hydraulic mechanism that then raises the basket releasing the newly formed bunch of straw.

The fundamental limitation with prior art straw bunchers is that they require operator intervention in order to raise and lower the rake to release a newly formed bunch of straw and begin collection of the next one. This requires that an operator must divide their attention between driving the machine, and noticing when it is time to release a straw bunch.

Thus, what is needed is a straw bunching apparatus that automatically releases a straw bunch at the appropriate time without the need for operator intervention. Such a device would increase the simplicity of a straw bunching operation, and reduce the time needed to process a field of straw since the operator could maintain a constant speed. Such an invention would also increase safety since the operator would not be regularly distracted by having to monitor the status of the bunching operation in order to release a newly formed straw bunch at the appropriate time.

SUMMARY OF THE INVENTION

Embodiments of the present invention comprise an apparatus that operates continuously, and with minimal operator monitoring in order to gather flax or other types of straw into bunches suitable for later processing.

In a preferred embodiment, the implement comprises a frame with wheels, which is configured to be towed behind a farm vehicle such as a tractor or other such suitable self-propelled machine. Mounted on the frame is a rotatable axle that includes one or more rake assemblies. Each rake assembly is made up of a number of struts extending from the rotatable axle. Each strut has one or more tines like those known to those of skill in the art of farm implements as being effective for sweeping up straw. The struts are arranged in rows along the length of the rotatable axle such that they form one or more rakes that function to gather the straw and the implement is operated.

Upon towing the implement, a drive assembly uses the motion of the main wheels of the implement to rotate the rotatable axle and rakes until a rake is in position to begin gathering straw. The positioning is dictated by a cam that forms part of the drive system. The cam is designed such that it will engage a drive wheel and turn until a flat spot on the cam rotates into position, at which point the cam loses contact with the drive wheel. At this point a trigger bar attached to the rotatable axle also engages a trigger assembly. The trigger assembly is configured to provide a resistive force that prevents the rotatable axle of the rake assembly from turning. As the implement is moved across a field, straw beings to accumulate, and as more straw is gathered by the implement, the force pushing rearwards on the rake increases accordingly. When the drag created by the accumulating straw creates sufficient force on the rake to overcome the resistive force of the trigger assembly, the trigger assembly releases the trigger bar, the rotatable axle rotates due to the mass of straw pushing against the rake as the implement continues to be towed. The cam is turned such that it again contacts a drive wheel and the motion of the main wheels assists in rotating the rake assembly, to release the collected straw and then position the next rake to begin gathering the next bunch of straw as before. The system is fully automated and straw is accumulated into bunches that are released behind the implement is it is continually moved over a field of straw to be bunched. The amount of straw per bunch can be varied by adjusting the amount of resistive force generated by the trigger assembly.

Thus, there is provided a farm implement configured to gather straw into bunches, the implement comprising: a frame comprising main wheels and configured to be towable behind a self-propelled vehicle; a rake assembly mounted on the frame, the rake assembly comprising a rotatable axle onto which are secured a plurality of struts and at least one trigger bar, wherein each strut comprises at least one tine configured to engage a mass of straw, and the trigger bar is configured to periodically engage a trigger assembly mounted on the frame; a rake drive assembly, the rake drive assembly comprising a first drive wheel connected to a second drive wheel via a drive linkage, and a cam mounted on an end of the rotatable axle of the rake assembly, wherein the first drive wheel contacts a main wheel of the implement, and the cam is configured to periodically contact the second drive wheel, such that rotation of the main wheel drives rotation of the rake assembly; wherein the trigger assembly comprises a trigger arm member, a rake stop, a bias member, and a latch; wherein one end of the trigger arm member is pivotally connected to the rake stop, and the opposite end of the trigger arm member is configured to engage the latch, wherein when the latch is engaged the trigger arm member is in an engagement position, and when the latch is released the trigger arm member moves to a release position; wherein one end of the bias member is pivotally connected to the rake stop, and the other end of the bias member is secured at a location between the two ends of the trigger arm member, and wherein the bias member is configured to provide a resistive force that counteracts force generated as straw is gathered by the rake assembly; wherein the rake stop further comprises a roller configured to engage the at least one trigger bar; and wherein the trigger assembly is configured to periodically engage the at least one trigger bar, and to release said trigger bar when the force of a mass of straw accumulating in front of the rake assembly acting upon the trigger bar exceeds the resistive force generated by the bias member.

In some embodiments, the plurality of struts is aligned in a row along the length of the rotatable axis, and wherein a row of struts and tines forms a rake. In some embodiments, the implement comprises at least two rakes.

In some embodiments, the implement further comprises a pair of fences disposed on either side of the frame, the fences operating cooperatively with a rake to gather straw into a bunch.

In some embodiments, the trigger assembly further comprises a latch actuator operative to release the trigger arm member from the latch when the trigger arm member has rotated through a pre-determined arc in response to a force applied to the trigger arm member by a trigger bar.

In some embodiments, the implement further comprises a hydraulic strut, wherein one end of the hydraulic strut is connected to the trigger arm member, and the opposite end of the hydraulic strut is secured to the frame, and the hydraulic strut is configured to return the trigger arm member to the engagement position from the release position following disengagement of the trigger bar. In some embodiments, the bias member is a spring. In some embodiments, the bias member is configured to be adjustable such that the resistive force can be varied.

There is also provided a method of collecting straw in bunches, the method comprising providing a farm implement configured to gather straw into bunches, the implement comprising: a frame comprising main wheels and configured to be towable behind a self-propelled vehicle; a rake assembly mounted on the frame, the rake assembly comprising a rotatable axle onto which are secured a plurality of struts, wherein each strut comprises at least one tine configured to engage a mass of straw, and at least one trigger bar, the at least one trigger bar secured to the rotatable axle; a rake drive assembly, the rake drive assembly comprising a first drive wheel connected to a second drive wheel via a drive linkage, a cam mounted on an end of the rotatable axle of the rake assembly, wherein the first drive wheel contacts a main wheel of the implement, and the cam is configured to periodically contact the second drive wheel, such that rotation of the main wheel drives rotation of the rake assembly; a trigger assembly mounted on the frame, comprising a trigger arm member, a rake stop, a bias member, a hydraulic strut, and a latch; wherein one end of the trigger arm member is pivotally connected to the rake stop, and the opposite end of the trigger arm member is configured to engage the latch, and wherein the trigger arm member can be rotated between an engagement position and a release position; wherein one end of the hydraulic strut is connected to the trigger arm member, and the opposite end of the hydraulic strut is secured to the frame, and the hydraulic strut is configured to return the trigger arm member to the engagement position from the release position; wherein one end of the bias member is pivotally connected to the rake stop, and the other end of the bias member is secured at a location between the two ends of the trigger arm member; wherein the rake stop further comprises a roller configured to engage the at least one trigger bar; and wherein the trigger assembly is configured to periodically engage the at least one trigger bar, and to release said trigger bar when the force of a mass of straw accumulating in front of the rake assembly acting upon the trigger bar exceeds a pre-determined resistive force generated by the trigger assembly; securing the implement to a vehicle; operating the vehicle so as to tow the implement over a field containing straw, with the effect of gathering the straw into bunches.

In some embodiments of the method, the straw to be gathered has been previously formed into windrows.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

DETAILED DESCRIPTION OF THE INVENTION

In flax farming operations, one of the challenges is the processing of waste plant material after the flax seed has been separated from the remainder of the plant. A significant challenge lies in dealing with the straw that remains following harvesting. While there are emerging markets for flaw straw, depending on the location of the farm and the quality of the straw, it may or may not be commercially viable to bale and ship off site. Since flax straw does not readily decompose, a traditional method of removal has been to collect straw into piles for subsequent burning. Prior art systems for collecting straw typically used a form of rake or basket, each of which was designed to be towed behind a farm vehicle like a tractor or combine. The rake would gather straw and when the operator determined the bunch was large enough, the rake or basket would be lifted to release the bunch, and the operation would continue.

A limitation in these prior art devices lies in the fact that they are all dependent on the operator to determine when the rake or basket is full, and then to perform some manual operation to lift the rake of basket to release the straw. This is inherently time-consuming, and further reduces safety as the operator is required to regularly divert their attention to the rake or basket. Alternatively, a spotter might be used, which increases the amount of manpower required for what is effectively a simple operation.

The present disclosure provides exemplary embodiments of an apparatus that can effectively bunch straw, but which is configured to automatically release a newly formed bunch from the rake without the need for direct operator intervention or constant monitoring. This system is useful not only for flax farming operations, but for other operations where it is desired to bunch piles of straw into discrete piles for easier handling.

Figure 1:
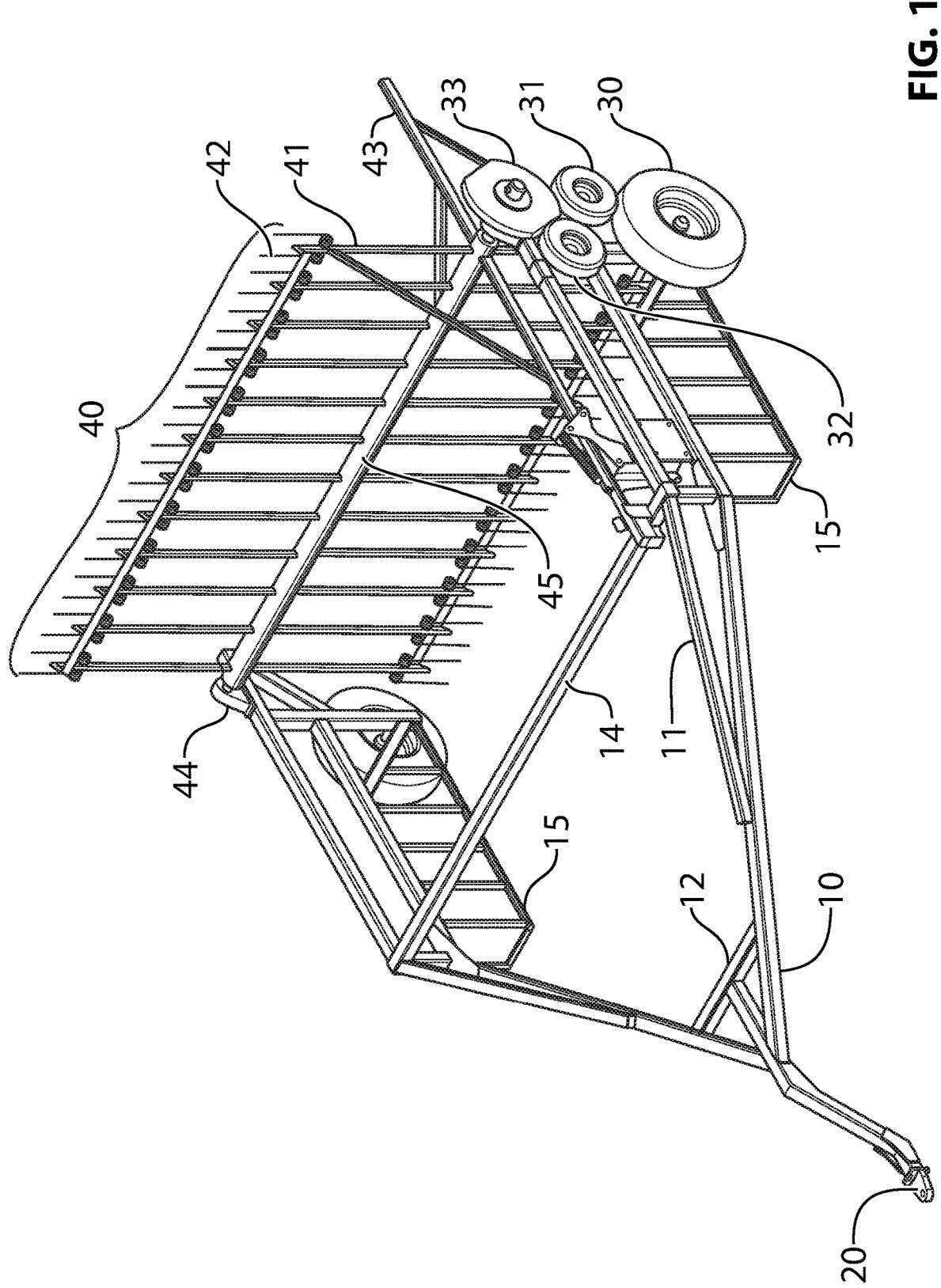
FIG. 1 is a perspective view of an embodiment of a straw buncher according to the present disclosure.

As shown in FIG. 1, the basic layout of the device is a frame 10, mounted on wheels 30, and which is designed to be towed behind a farm vehicle such as a combine or tractor. Conveniently, the straw buncher is connected to the farm vehicle by a hitch 20 or similar such connection. To improve strength and increase rigidity, the frame can include a variety of additional support member 11, 12, 14. The frame also includes a pair of fences 15 on either side, the fences operative to contain straw within the track of the straw buncher and to prevent straw from spilling out the sides of the implement.

Figure 2:
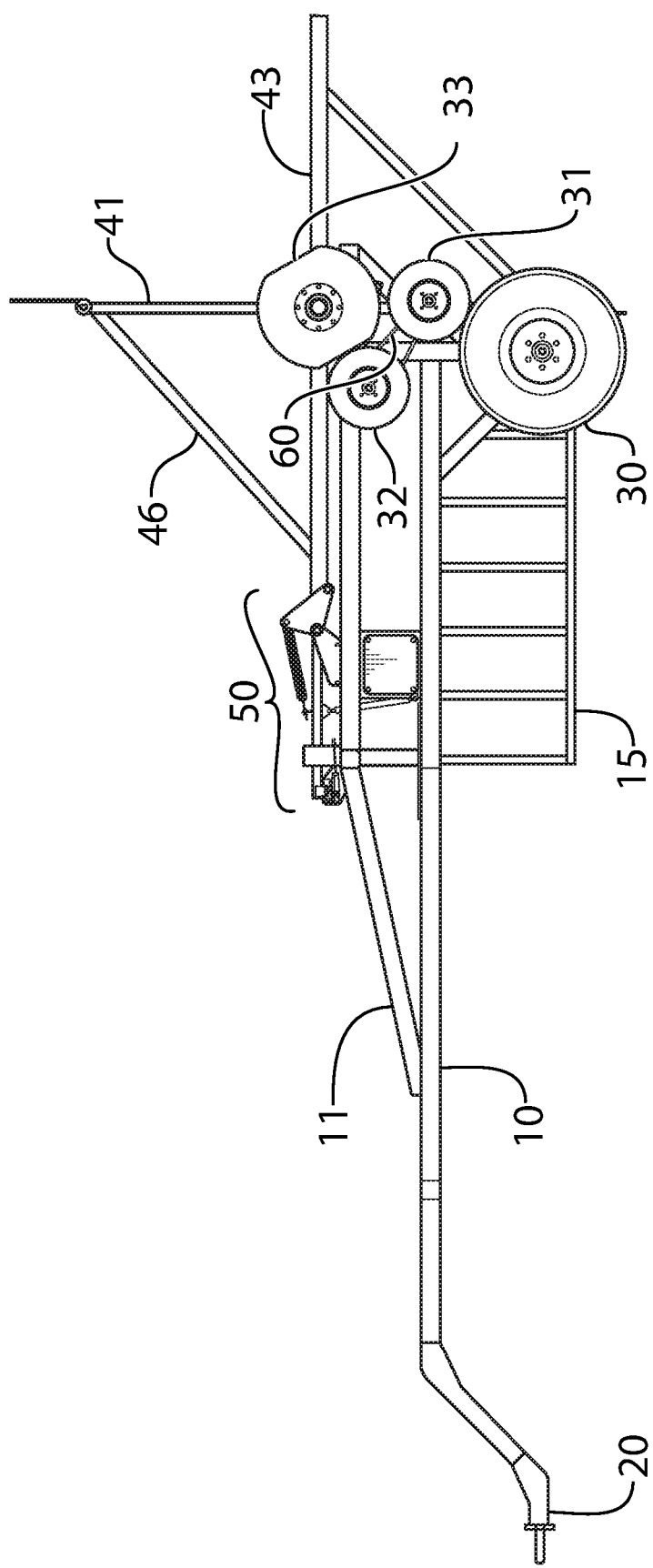
FIG. 2 is a side, transparent view of an embodiment of a straw buncher according to the present disclosure.

Mounted on the frame are a pair of supports 44 onto which a rotatable axle 45 is mounted. The supports can comprise bearings, bushings and other comparable structure. In one case, the axle further comprises a pair of rakes 40 or batts that extend outward from the axle. These rakes or batts will be operative to collect straw in a windrow and to effectively sweep straw into larger bunches. Each rake further comprises a number of struts 41, each strut further comprising a tine assembly 42. Also, attached to the axle 45 are one or more trigger bars 43, each trigger bar configured to periodically engage a trigger release mechanism 50 as will be discussed below. As shown in FIG. 2, a brace 46 can also be included to further support a strut on a rake assembly 40 with a trigger bar 43.

While the exemplary embodiment depicted in FIG. 1 shows an axle comprising two rakes, it should be realized that one rake, or more than two rakes, could be utilized as well. Regardless of the number of rakes, they will generally be disposed equidistantly around the circumference of the axle. So, as shown in FIG. 1, where two rakes are used, they will be diametrically opposite each other on the axle. Three rakes would be offset from each other by 120° of arc, 4 rakes by 90° of arc and so on.

Figure 3:
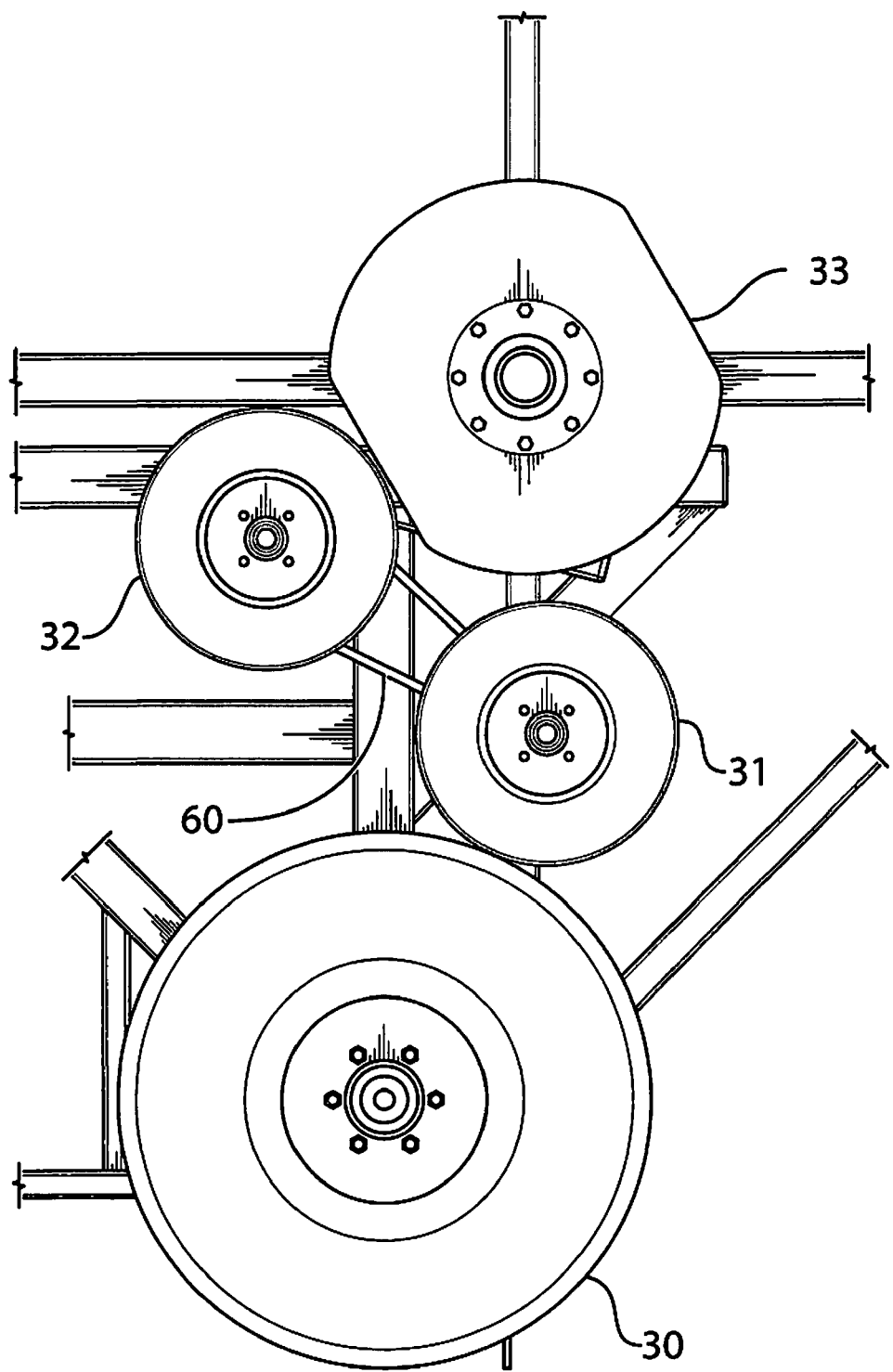
FIG. 3 is a closer view of an embodiment of a rake drive system for use in a straw buncher according to the present disclosure.

With respect to the operation of the rakes to collect and bunch straw, reference is made to FIGS. 1 through 4 inclusive. As can be seen in FIGS. 1 and 3, also mounted on the apparatus is a first drive wheel 31, a second drive wheel 32, and a cam 33. In a preferred embodiment, the first drive wheel is in contact with one of the main wheels 30, such that when the straw buncher is being moved by a vehicle, the turning of the main wheel will result in the first drive wheel turning in the opposite direction. As can also be seen in FIGS. 1, 2 and 3, the first drive wheel 31 is connected to the second drive wheel 32 by a drive linkage 60. The drive linkage can be a flexible belt, a chain or any such other similar means known to those of skill in the art. The first and second drive wheels may also include sprockets and other such similar structures to engage the drive linkage and to prevent slippage of the drive linkage relative to the first and second drive wheels.

Figure 4:
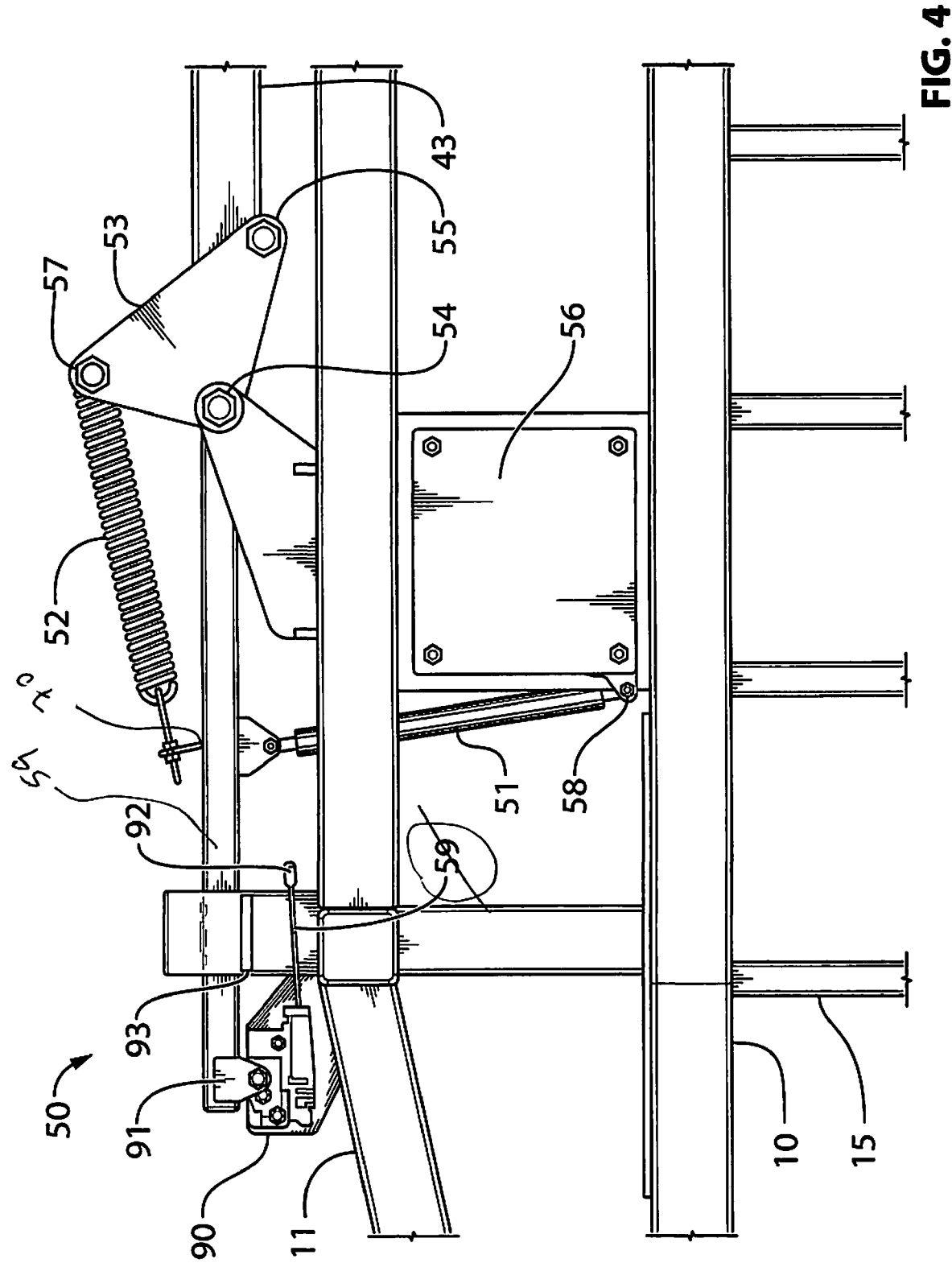
FIG. 4 is a closer view of an embodiment of a trigger mechanism for use in a straw buncher according to the present disclosure.

FIG. 4 depicts an embodiment of a trigger mechanism 50. The trigger mechanism operates to prevent rotation of the rotatable axle 45 such that a rake 40 is substantially maintained in a position whereby straw accumulates ahead of the rake in the space between the two fences 15 as the straw buncher is towed by a farm vehicle over a windrow of straw to be collected and bunched. In one embodiment, the trigger mechanism operates as follows.

Either in response to the drive system components 31, 32, 33, or drag created by straw accumulating at the face of a rake, the rotatable axle and rake will rotate in the same direction as the wheels 30 until a trigger bar engages the rake stop 53 portion of the trigger mechanism. The rake stop is mounted to the frame of the buncher at a trigger arm pivot 54, and frame mount 56. The pivot allows the rake stop to rotate back and forth in response to a downward force exerted on it by a trigger bar, and an upward force exerted by a bias member 52 or other such device that is operative to create bias force, for example a spring. In one embodiment, a spring is connected at one end to a rake stop bias member attachment point 57 and at its opposite end to a trigger arm member 59 at a trigger arm bias member attachment 70. The trigger arm member is thus supported at two points, the trigger arm pivot 54, and at its opposite to a push-to-close latch and actuator 90, 92.

The trigger mechanism can also comprise a hydraulic strut 51 that will exert a force on the trigger arm member to resist movement of the trigger arm by force exerted by the trigger bar 43. The hydraulic strut connects at one end to the trigger arm member, and at its opposite end to the frame at a strut pivot 58.

A roller 55 allows the trigger bar to move more freely with respect to the trigger mechanism even while it is engaged with the pivot. The rake stop is secured to the frame by a mounting block 56.

Once the trigger bar has engaged the rake stop, it will be prevented from rotating further by the upward force generated by the components of the trigger mechanism, in particular, the force produced by the spring and gas strut. As straw accumulates in front of the rake, the mass of the straw will tend to push backwards against the rake creating a force moment that would otherwise cause the rake to rotate. However, because the trigger bar is engaged in the trigger mechanism, the rake will be prevented from rotation until the force generated by the straw accumulating in the buncher overcomes the force generated by the trigger mechanism. At that point, the trigger mechanism will release, allowing the rake and rotatable axle to rotate in response to the mass of straw pushing on the rake as the implement continues to be towed forward. As the axle and rake rotate, the curved portion of the cam will contact the second drive wheel, and the drive system will assist in turning the axle and rake, thus releasing the bunched straw out the back of the implement. The drive system will continue to cause the axle and rakes to rotate, until the next flat portion of the cam rotates into position and the cam loses contact with the second drive wheel. The positioning of the cam with respect to the rake is such that when the cam loses contact, a rake will now be in position to block the back of the implement, the rake will be prevented from rotating further as the trigger bar engages the trigger arm pivot, thus causing straw to bunch ahead of the rake as before. This cycle will repeat continuously as an operator tows the straw buncher over a windrow of straw to be gathered.

As the apparatus is continuously moved the process repeats itself with straw accumulating in front of a rake until sufficient drag created by the straw mass trips the mechanism, releasing a pile of straw and moving another rake into position. Because the mechanism is tripped automatically be the mass of the straw, the operator does not have to either stop to release a pile of straw it gets to a certain size, or continuously monitor the size of a forming pile in order to actuate a mechanism manually to release the formed pile and begin collecting the next one.

As indicated above, trigger release mechanism also includes a push to close latch 90 and actuator 92. As the trigger bar 43 engages and pushes downwards on the rake stop 53, accumulating straw will result in an increasing force pushing down on the trigger arm member 59, counteracted by the resistive force generated by the bias force member 52. As the mass of straw in front of the rake increases, this will cause a tendency for the trigger arm member 59 to rotate about the pivot 54 such that the latch end 91 of the member will rise. At some point an actuator 92 will contact a bumper 93 causing the latch 90 to release the trigger arm member 59. The member will rotate about the trigger arm pivot 54 eventually allowing the trigger bar 43 to clear the end and disengage from the rake stop 53. Once the trigger bar has disengaged, and there is no force exerted on the rake stop, the hydraulic strut or similar such device will return the trigger arm member 59 to its original position, wherein the trigger arm member 59 will re-engage the latch, and the trigger arm member 59 will be in position to engage the next trigger bar to rotate into position.

The present disclosure also provides for a method of gathering straw into bunches that improves upon prior art methods. The method comprises providing a farm implement as described herein, connecting the implement to a self-propelled vehicle such as a truck, tractor or other vehicle suitable for working an agricultural field. The implement is towed across the field and straw then beings to accumulate by operation of the rakes as described above. The advantage of the present system is that the operator does not need to divert their attention to the accumulating straw since the system is designed to release a straw bunch once it attains a certain size and/or mass. The size of the bunches can be varied by adjusting the amount of resistive force generated by the bias member of the trigger assembly. Conveniently, the present method includes towing the implement in a free form manner over a field, or following previously laid down windrows of straw created in a threshing operation.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A farm implement configured to gather straw into bunches, the implement comprising:
   a frame comprising main wheels and configured to be towable behind a self-propelled vehicle;
   a rake assembly mounted on the frame, the rake assembly comprising a rotatable axle onto which are secured a plurality of struts and at least one trigger bar, wherein each strut comprises at least one tine configured to engage a mass of straw, and the trigger bar is configured to periodically engage a trigger assembly mounted on the frame;
   a rake drive assembly, the rake drive assembly comprising a first drive wheel connected to a second drive wheel via a drive linkage, and a cam mounted on an end of the rotatable axle of the rake assembly, wherein the first drive wheel contacts a main wheel of the implement, and the cam is configured to periodically contact the second drive wheel, such that rotation of the main wheel drives rotation of the rake assembly;
   wherein the trigger assembly comprises a trigger arm member, a rake stop, a bias member, and a latch;
      wherein one end of the trigger arm member is pivotally connected to the rake stop, and the opposite end of the trigger arm member is configured to engage the latch, wherein when the latch is engaged the trigger arm member is in an engagement position, and when the latch is released the trigger arm member moves to a release position;
      wherein one end of the bias member is pivotally connected to the rake stop, and the other end of the bias member is secured at a location between the two ends of the trigger arm member, and wherein the bias member is configured to provide a resistive force that counteracts force generated as straw is gathered by the rake assembly;
      wherein the rake stop further comprises a roller configured to engage the at least one trigger bar; and
   wherein the trigger assembly is configured to periodically engage the at least one trigger bar;
   wherein as straw is gathered by the rake assembly an increasing amount of force is exerted on the rake assembly, said force transmitted directly from the rake assembly to the at least one trigger bar; and
   wherein the trigger assembly is configured to release said trigger bar when the force of a mass of straw accumulating in front of the rake assembly and acting upon the trigger bar exceeds the resistive force generated by the bias member.

2. The implement of claim 1, wherein the plurality of struts is aligned in a row along the length of the rotatable axis, and wherein a row of struts and tines forms a rake.

3. The implement of claim 2, comprising at least two rakes.

4. The implement of claim 1, further comprising a pair of fences disposed on either side of the frame, the fences operating cooperatively with a rake to gather straw into a bunch.

5. The implement of claim 1, wherein the trigger assembly further comprises a latch actuator operative to release the trigger arm member from the latch when the trigger arm member has rotated through a pre-determined arc in response to a force applied to the trigger arm member by a trigger bar.

6. The implement of claim 1, further comprising a hydraulic strut, wherein one end of the hydraulic strut is connected to the trigger arm member, and the opposite end of the hydraulic strut is secured to the frame, and the hydraulic strut is configured to return the trigger arm member to the engagement position from the release position following disengagement of the trigger bar.

7. The implement of claim 1 wherein the bias member is a spring.

8. The implement of claim 1, wherein the bias member is configured to be adjustable such that the resistive force can be varied.

* * * * *